United States Patent [19]
Munday

[11] Patent Number: 5,493,808
[45] Date of Patent: Feb. 27, 1996

[54] CONTROLLED ATMOSPHERE STORAGE CHAMBER

[75] Inventor: James T. Munday, Brisbane, Australia

[73] Assignee: Apolan Pty Ltd., Queensland, Australia

[21] Appl. No.: 117,825

[22] Filed: Sep. 7, 1993

[30] Foreign Application Priority Data

May 25, 1993 [AU] Australia ................................ 38784/93

[51] Int. Cl.$^6$ .................................................. A01G 31/00
[52] U.S. Cl. .............................. 47/60; 454/230; 454/233; 47/17
[58] Field of Search ..................... 312/236, 116; 454/230, 232, 233, 296, 301, 306, 188, 191; 47/17 EC, 60 EC

[56] References Cited

U.S. PATENT DOCUMENTS

| | | | |
|---|---|---|---|
| 815,093 | 3/1906 | Keeney | 454/306 |
| 1,506,904 | 9/1924 | Harrison | 454/306 |

FOREIGN PATENT DOCUMENTS

| | | | |
|---|---|---|---|
| 3948289 | 2/1990 | Australia . | |
| 628067 | 2/1990 | Australia | 47/60 EC |
| 74759 | 9/1952 | Denmark | 454/230 |
| 1164242 | 10/1958 | France | 454/306 |
| 3840847 | 6/1989 | Germany | 312/236 |
| 121794 | 10/1927 | Switzerland | 454/233 |
| 992490 | 5/1965 | United Kingdom | 312/236 |

*Primary Examiner*—Henry E. Raduazo
*Attorney, Agent, or Firm*—Panitch Schwarze Jacobs & Nadel

[57] ABSTRACT

A controlled atmosphere storage chamber (22) including:

(i) means (34) for generating cooled and pressurised air located within or adjacent the chamber such as an airconditioner;

(ii) one or more air supply ducts (28) associated with the generating means for circulating said cooled and pressurized air throughout the chamber (22) wherein the or each supply duct (28) extends substantially the length of the chamber (22) and has an unrestricted air flow passage which has a transverse dimension or width that tapers progressively inwardly throughout its length towards an end remote from the generating means (34);

(iii) air outlet means (51, 61, 62) associated with the or each supply duct (28) which air outlet means (51, 61, 62) extends substantially the length of the or each supply duct (28);

(iv) one or more elongate hollow storage members (23) having one or more heat sources (27) located closely adjacent thereto wherein the interior of the or each storage member functions as a return duct (29) for return of heat laden air to the generating means (34) characterized in that the or each return duct (29) extends substantially the length of the chamber (22) and has an unrestricted air flow passage which has a transverse dimension or width that tapers progressively outwardly throughout its length towards an end remote (59) from the generation means (34); and (v) air inlet means (52, 54) associated with the or each return duct (29) extending substantially the length of the or each return duct (29).

21 Claims, 7 Drawing Sheets

CONTROLLED ATMOSPHERE STORAGE CHAMBER

FIELD OF INVENTION

This invention relates to a controlled atmosphere storage chamber which may represent a building interior comprising one or more rooms, a vehicle interior, the interior of a container, or a transportable container.

BACKGROUND OF THE INVENTION

Hitherto a conventional controlled atmosphere storage chamber was described in Australian Patent 628067 which included means for generating cooled and pressurised air such as an air conditioner, one or more feed ducts in fluid communication with the air conditioner for circulating the cooled and pressurised air throughout the chamber, a plurality of hollow storage shelves having strip lighting in the form of fluorescent tubes mounted to the underside of each shelf and return ducts for returning heat laden spent air to the air conditioner which are located in the hollow interior of each storage shelf. There was also provided humidifying ducts for circulation of humidified air throughout the chamber.

The storage chamber of Australian Patent 628067 was characterised by the separation of the feed ducts and return ducts in such a manner that the flow of air within the chamber was such as to control heat emission within the vicinity of each lighting strip within a surrounding envelope that represented only a minor proportion of the total volume of the chamber.

The controlled storage chamber of Australian Patent 628067 was generally constructed as an experimental prototype and during operation it was found to be unsatisfactory in several respects because there was no proper control placed on suitable monitoring of variables which contributed to a controlled atmosphere such as (i) heat, (ii) air pressure, (iii) air velocity, and (iv) humidity. Without such monitoring taking place it was found in practice that "hot spots" or localised heat pockets occurred in the chamber which was extremely deleterious to perishable products placed on the storage shelves leading to product spoilage, lack of germination of plants, lack of proper maintenance of cell cultures and bacterial cultures and introduction of pathogens into a sterile atmosphere.

This therefore meant that the controlled atmosphere storage room of Australian Patent 628067 was neither energy efficient nor cost efficient and did not provide a precisely monitored atmosphere in respect of the abovementioned variables which is essential for properly conducted research facilities especially in biological applications involving recombinant DNA technology or tissue culture experiments.

It therefore is an object of the invention to provide a controlled atmosphere storage chamber which may alleviate the abovementioned disadvantages of the prior art.

SUMMARY OF THE INVENTION

The controlled atmosphere storage chamber of the invention therefore includes (i) means for generating cooled and pressurised air located within or adjacent the chamber;

(ii) one or more air supply ducts associated with the generating means for circulating said cooled and pressurised air throughout the chamber wherein the or each supply duct extends substantially the length of the chamber and has an unrestricted air flow passage which has a transverse dimension or width that tapers progressively inwardly throughout its length towards an end remote from the generating means;

(iii) air outlet means associated with the or each supply duct which air outlet means extends substantially the length of the or each supply duct;

(iv) one or more elongate hollow storage members having one or more heat sources located closely adjacent thereto wherein the interior of the or each storage member functions as a return duct for return of heat laden air to the generating means characterised in that the or each return duct extends substantially the length of the chamber and has an unrestricted air flow passage which has a transverse dimension or width that tapers progressively inwardly throughout its length towards an end remote from the generation means; and (v) air inlet means associated with the or each return duct extending substantially the length of the or each return duct.

In relation to the storage chamber described in Australian Patent 628067 in practice it was ascertained that not only were a vastly variable, undesirable and unstable array of hot spots produced but also there were localised areas of little or no air circulation which differed in location in one plane but also at different levels or heights throughout the chamber. This meant that it was extremely difficult if not impossible to provide a chamber with uniform air distribution throughout the chamber.

It was also found in regard to the rectangular air supply duct utilised in the storage chamber of Australian Patent 628067 that such rectangular air supply duct was mainly responsible for the abovementioned disadvantages of the prior art. In research which led to the development of the present invention it was ascertained that the initial air velocity as air entered the supply duct was greater than the final air velocity as the air reached an end of the rectangular duct remote from the air conditioner.

In accordance with the present invention it therefore was necessary to provide air supply duct(s) which were tapered or otherwise shaped so as to compensate for the decrease in air velocity from an inlet of the air supply duct to an outlet thereof. This also meant that the return duct(s) had to be of similar taper to the supply duct(s) to achieve a desirable objective of uniform air distribution throughout the chamber wherein a similar taper is understood to mean that the supply duct and the return duct both have a transverse dimension which tapers inwardly toward an end remote from the generating means.

The air supply duct(s) and the air return duct(s) may be of generally conical shape or of a shallow cuboidal shape which is generally trapezoidal in plan. However it is important to stress that the air duct(s) may be of rectangular shape or of a shallow cuboidal shape which is rectangular in plan as described in Australian Patent 628067 in relation to the air supply duct providing that the duct(s) are modified in accordance with the present invention to provide an unrestricted air passage which has a tapered shape wherein the taper extends progressively inwardly from an end adjacent the generation means to an end remote from the generation means in relation to the supply duct(s) and has a similar taper in relation to the return duct(s).

This may be achieved by providing a plurality of baffles along each opposed side of the rectangular air duct(s) which have a length or height which is progressively increased from adjacent the air generation means to the remote end in the case of the air supply ducts and wherein the length or height of the baffles are progressively increased from the end adjacent the air generation means to the remote end in the case of the air return duct(s). In this regard the baffles are suitably oriented normal to the longitudinal axis of the or each air duct. However this is not essential and the baffles may extend at an acute angle to the longitudinal axis provided that their effective height (ie. their distance from their free ends to an adjacent side wall of the air duct measured normal to the plane of the side wall) progressively increases as described above.

The air generation means used in the invention may be of any suitable type and thus correspond to air conditioning means as described in Australian Patent 628067 and in one form may comprise a centralised air conditioning system using refrigerated cooling coils or a decentralised air conditioning system using an evaporative cooling system.

The air outlet means of the air supply duct(s) may comprise one or more elongate slots extending substantially the length of the storage chamber or alternatively may comprise one or more rows of outlet apertures.

In similar fashion the air inlet means of the or each return duct may comprise one or more elongate slots extending substantially the length of the storage chamber or alternatively may comprise one or more rows of inlet apertures.

The elongate storage members utilised in the controlled storage chamber of the present invention may comprise an elongate box of any suitable shape to thereby form a storage shelf with perishable products stored on a top surface of the elongate box.

The heat sources utilised in the present invention may be of any suitable type but suitably include electrical lighting in the form of a row of light globes but more suitably strip lighting in the form of fluorescent tubes. Such strip lighting may be attached to the underside of each storage member.

There also may be provided humidifying means for the storage chamber which may comprise a water supply or water source heated by suitable heating means. The air supply duct(s) may be utilised for supply of humidified air to the chamber.

The storage chamber may also be supplied with at least one heat sensor or probe which is suitably located adjacent the storage shelves. More preferably there may be utilised a plurality of heat sensors wherein such heat sensors are located adjacent each shelf in the storage chamber.

There also may be supplied at least one air pressure sensor located in the air supply duct or air return duct. However, more suitably there are provided a plurality of air pressure sensors which are located in both the air supply duct(s) and air return duct(s).

There also may be supplied at least one air velocity sensor which may be provided in the air supply duct or the air return duct. However more suitably there are provided a plurality of air velocity sensors located in the air supply duct(s) and the air return duct(s).

There also may be provided one or more humidity sensors if required.

The presence of the abovementioned sensors are desirably utilised for precise monitoring of the variables that contribute to the controlled atmosphere that may be achieved in the storage chamber. Suitably each sensor is electrically connected to one or more microprocessors which may be interfaced to a computer at a location remote from the storage chamber. This means that predetermined values of temperature, pressure, velocity and humidity may be provided to the storage chamber and it is the function of the microprocessor(s) to maintain the predetermined values. When it is required to change these values it is then necessary to carry out such change by use of the computer.

BRIEF DESCRIPTION OF THE DRAWINGS

Reference may now be made to a preferred embodiment of the present invention wherein.

DETAILED DESCRIPTION OF THE PREFERRED EMBODIMENTS

Figure 1:
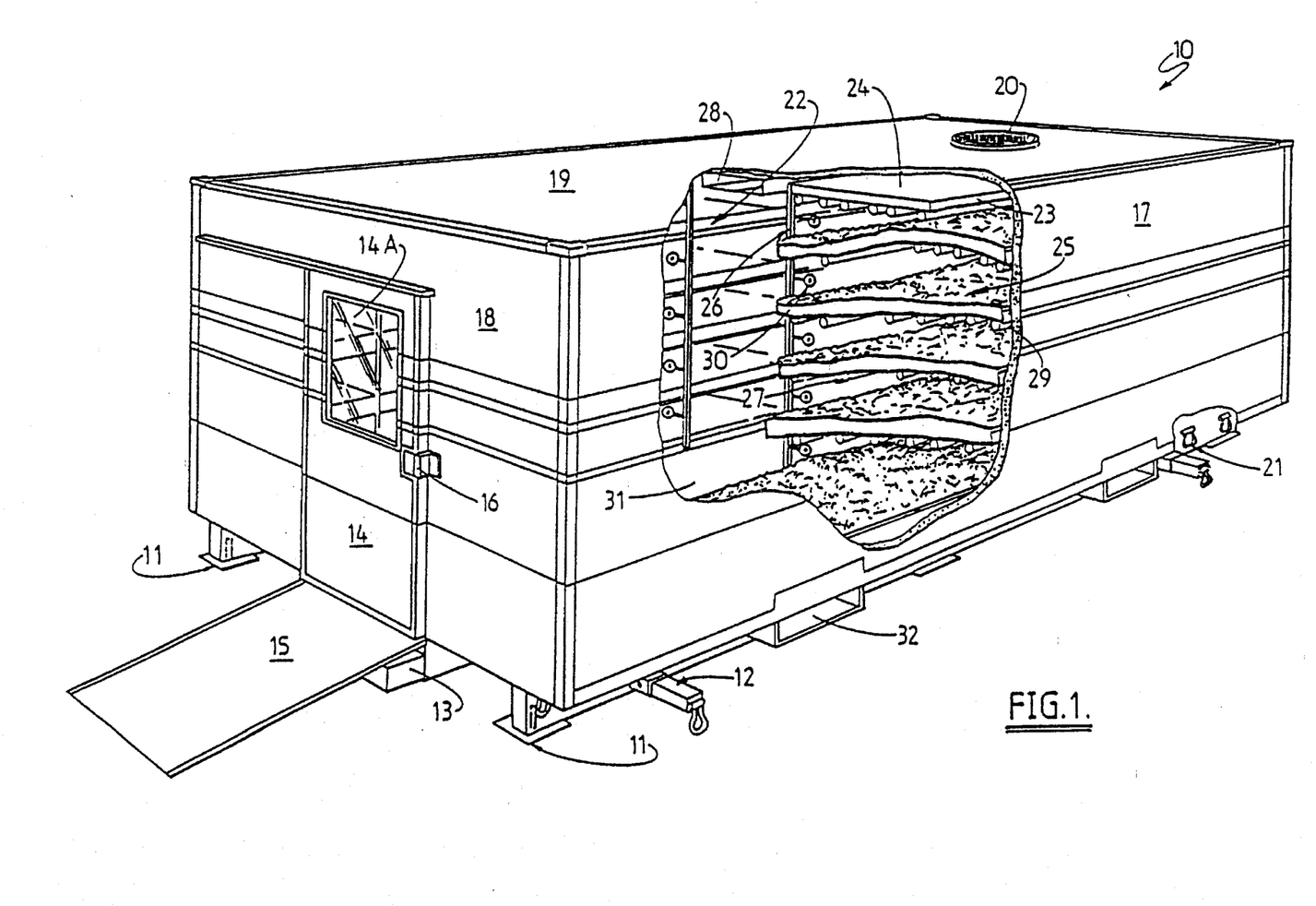
FIG. 1 refers to a perspective view of a transportable container containing a controlled atmosphere storage chamber in accordance with the present invention taken from one end of the container.

In FIG. 1 of the drawings the container 10 is transportable and includes feet 11 which may be adjustable in height, a retractable crane hook assembly 12 which may be pulled out if required so that the container 10 may be lifted by crane if desired, a step 13 which may be extended or retracted as the case may be, a door 14 having window 14A, ramp 15, lock 16, a pair of side walls 17, a front wall 18 and a roof 19 having an air vent 20. There is also shown lugs 21 for attachment of cables or chains (not shown) when the container 10 is transported by truck.

The container 10 contains a controlled atmosphere storage chamber 22 which has a plurality of elongated storage members 23 including a shelf surface 24 which may be utilised for supporting products such as plants 25, support uprights 26 for supporting storage members 23, strip lighting 27, air supply duct 28 which is of shallow cuboidal shape as shown and air return ducts 29. The interiors of the elongated storage members 23 function as the return ducts 29. There are also provided heat sensors 30 as well as aisle 31. There is also shown forklift retaining members 32.

Figure 2:
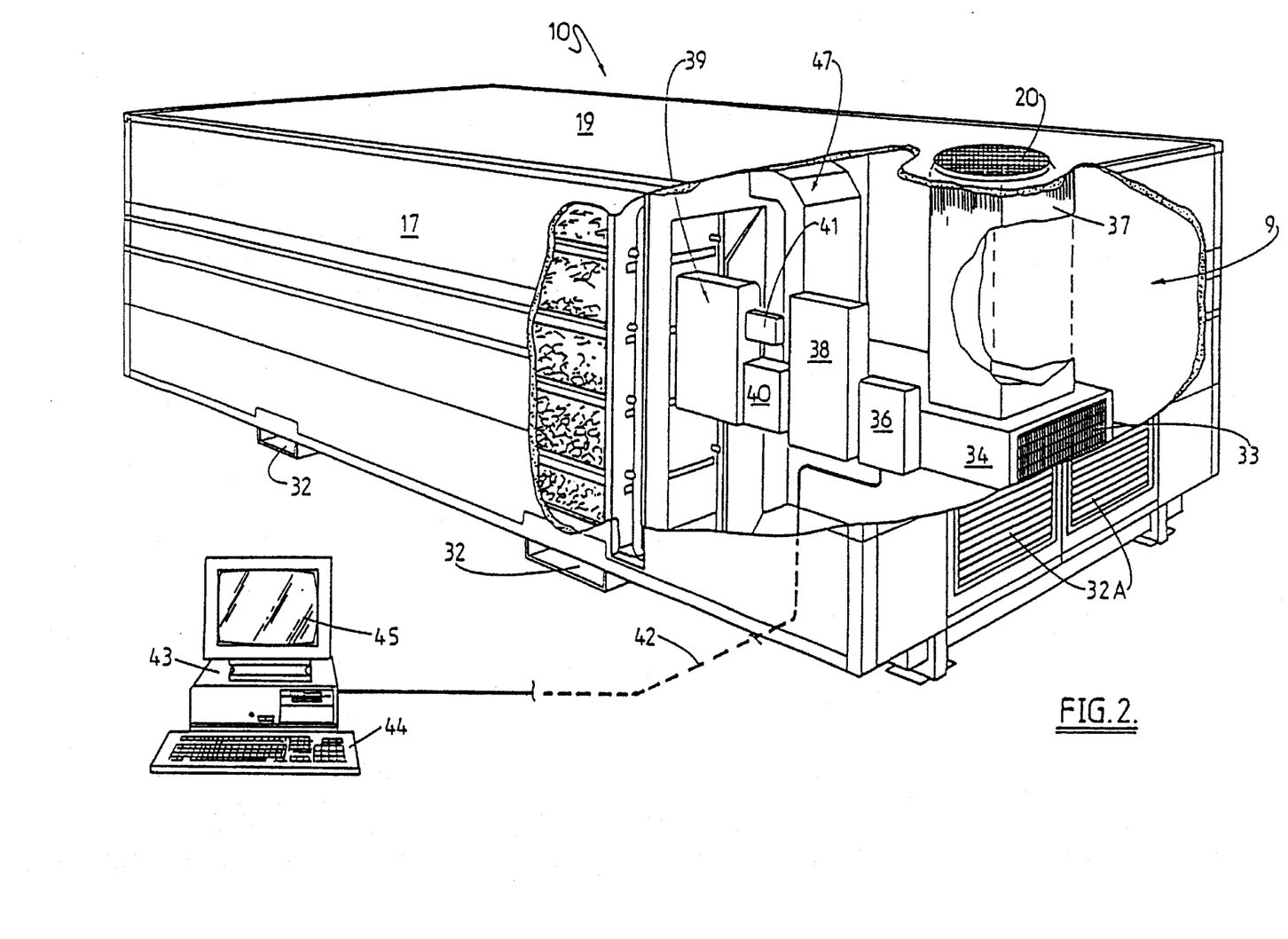
FIG. 2 is a perspective view of the transportable container of FIG. 1 taken from an opposite end of the container to that shown in FIG. 1.

In FIG. 2 the container 10 includes grilles 32A adjacent an inlet grille 33 of air conditioner 34 located in rear chamber 9 of container 10. Chamber 9 also contains microprocessor control module 36, outlet duct 37 for discharging spent air from air conditioner 34 through air vent 20, control cabinet 38 which contains relevant electrical componentry for operation of storage chamber 22, humidifier 39, power inlet or switchboard 40, cabinet 41 containing manual override switches for the lighting strips 27 and communication cable 42 for connection of the microprocessor(s) to a computer 43 having keyboard 44 and visual display unit 45. The switchboard 40 may connect the storage chamber 22 to an external power supply. Heat sensors 30 are, as well as the air pressure sensors, air velocity sensors and humidity sensors referred to hereinafter, electrically connected to the microprocessor(s). The communication cable 42 may be replaced by a radio link if required.

Figure 3:
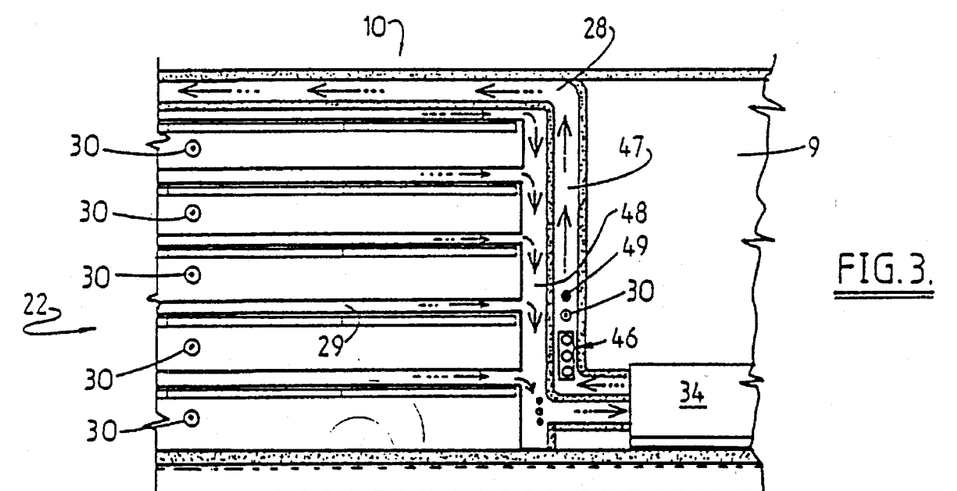
FIG. 3 is a side sectional view through the storage chamber of FIG. 1 showing the arrangement of an air supply duct and air return ducts in fluid communication with an air conditioner.
Figure 4:
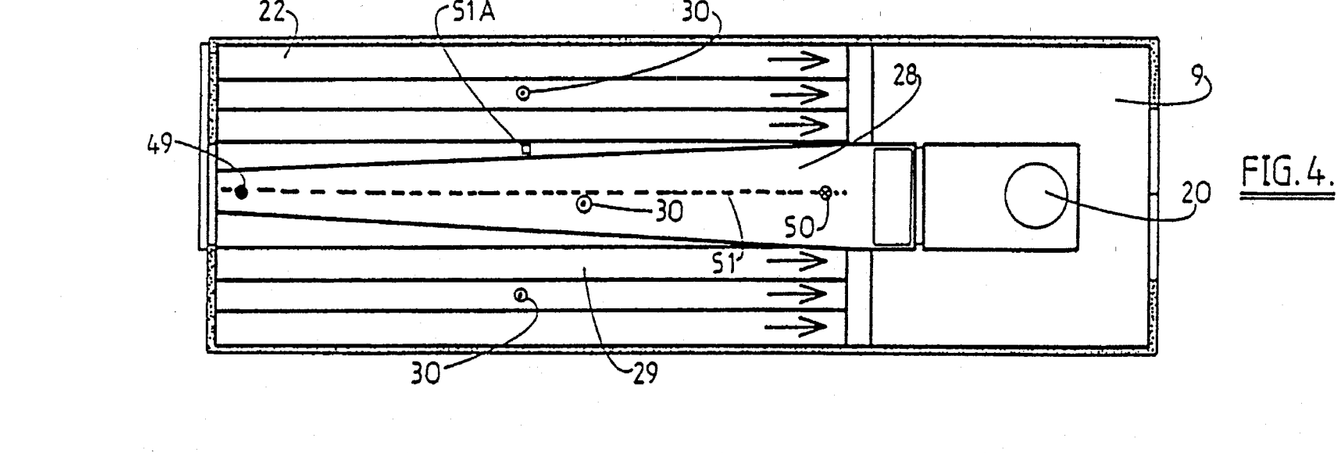
FIG. 4 is a plan view of the storage chamber of FIG. 1 showing the arrangement of an air supply duct and air return ducts.

In FIGS. 3–4 there is shown the flow of air indicated by arrows through air supply duct 28 and return of the air through return ducts 29. Also illustrated are heating elements 46 as well as air supply plenum 47 and return air plenum 48 as well as air pressure sensor 49 and air velocity sensor 50. In FIG. 4 there is shown the outlet slot 51 for air supply duct 28 which extends substantially the length of storage chamber 22. Humidity sensor 51A is also shown.

Figure 5:
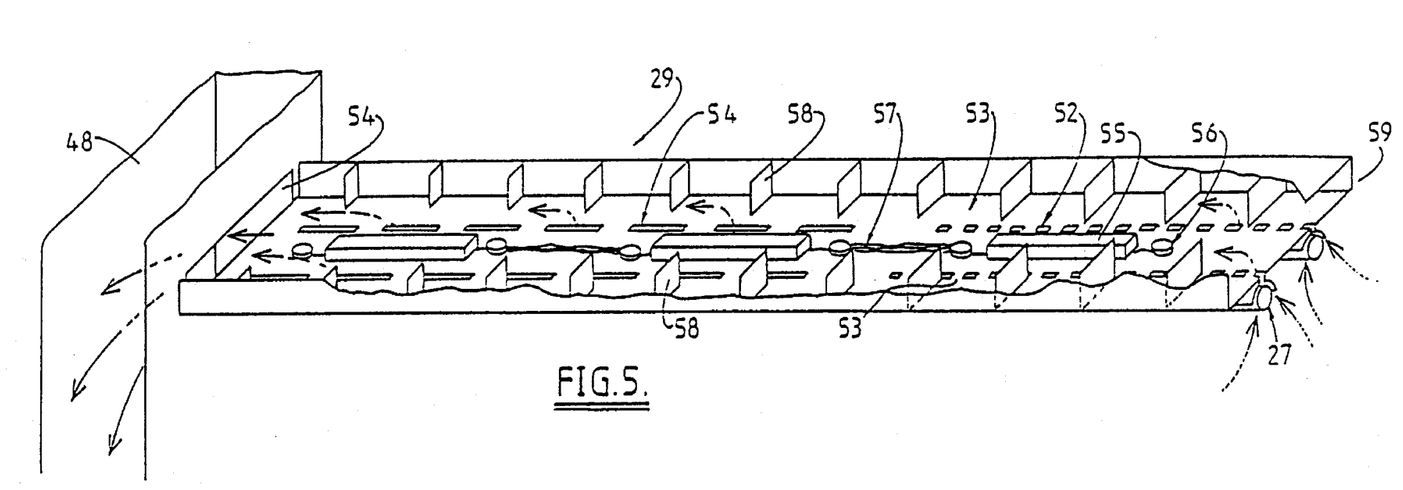
FIG. 5 is a perspective view of an air return duct utilised in the storage chamber of FIG. 1.
Figure 6:
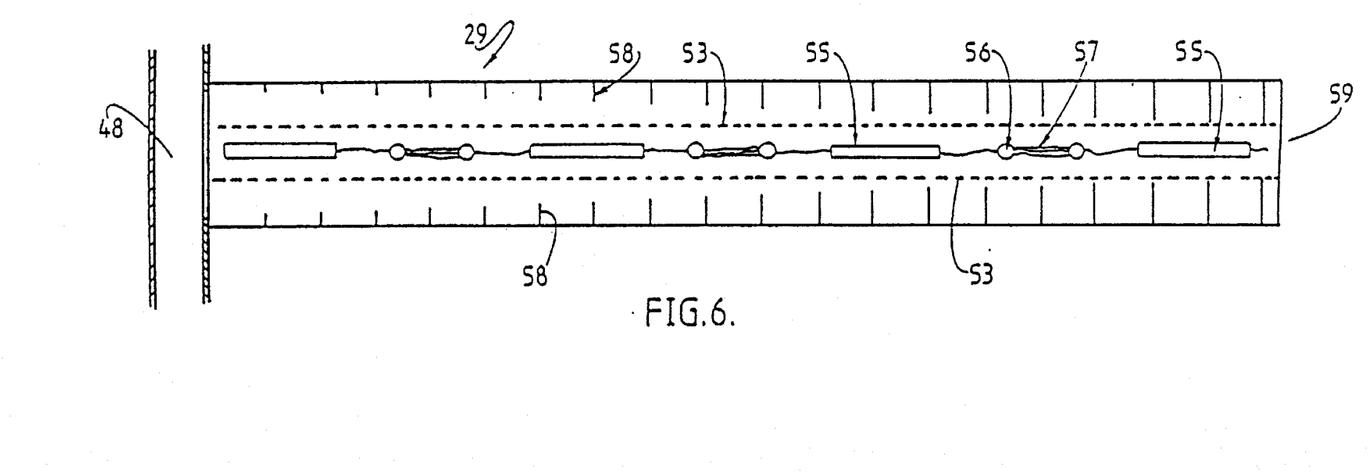
FIG. 6 is a plan view of the air return duct shown in FIG. 5.

In FIGS. 5–6 there are shown views of a return duct 29 and associated plenum 48. Air as indicated by the arrows flows through inlet slots 52 which may be arranged in a pair of rows 53 as shown. Inlet slots 54 of a longer length may also be utilised if required. The air may extend through outlet aperture 54 and return to air conditioner 34 through plenum 48 as shown and also as indicated by the arrows. The air return duct may also include boosters 55, electrical connections 56 and wiring 57. Also shown are baffles 58 which as best shown in FIG. 6 taper progressively inwardly toward plenum 48 or alternatively may be considered to taper progressively outwardly towards remote end 59 from air conditioner 34 or plenum 48.

Figure 7:
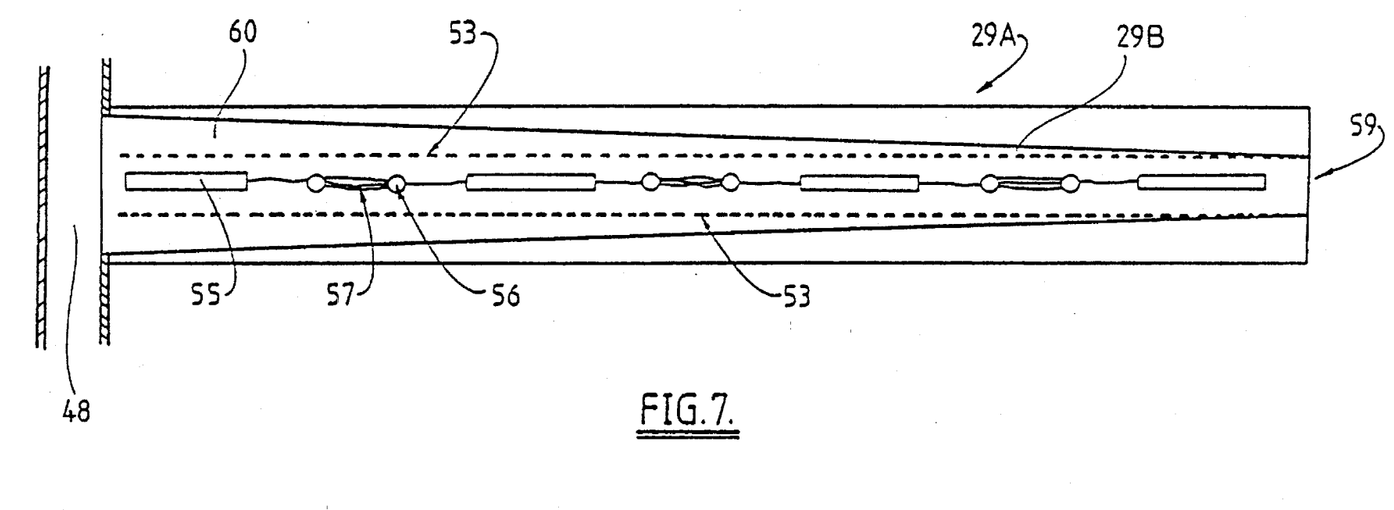
FIG. 7 is a view of an alternative form of air return duct to that shown in FIGS. 5 or 6.

In FIG. 7 there is shown a modified return duct 29A which may include an unrestricted air flow passage 60 which tapers progressively inwardly towards the end 59 remote from plenum 48 or air conditioner 34. Air flow passage 60 may include tapered side walls 29B and be supported in rectangular housing 29C.

Figure 8:
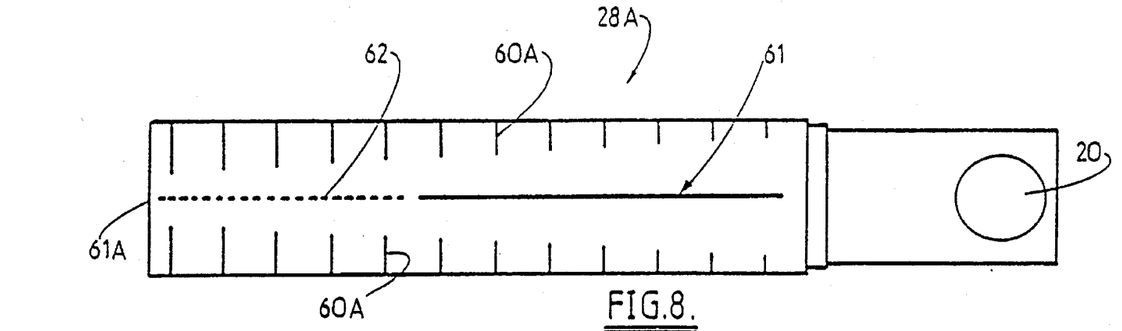
FIG. 8 is a view of an alternative form of air supply duct to that shown in FIG. 4.

In FIG. 8 there is shown a modified air supply duct 28A having a plurality of baffles 60A each having a length or height which progressively increases toward a remote end 61A from air conditioner 34. Also shown is inlet slot 61 which may, if desired, be one or more rows of apertures 62.

Figure 9:
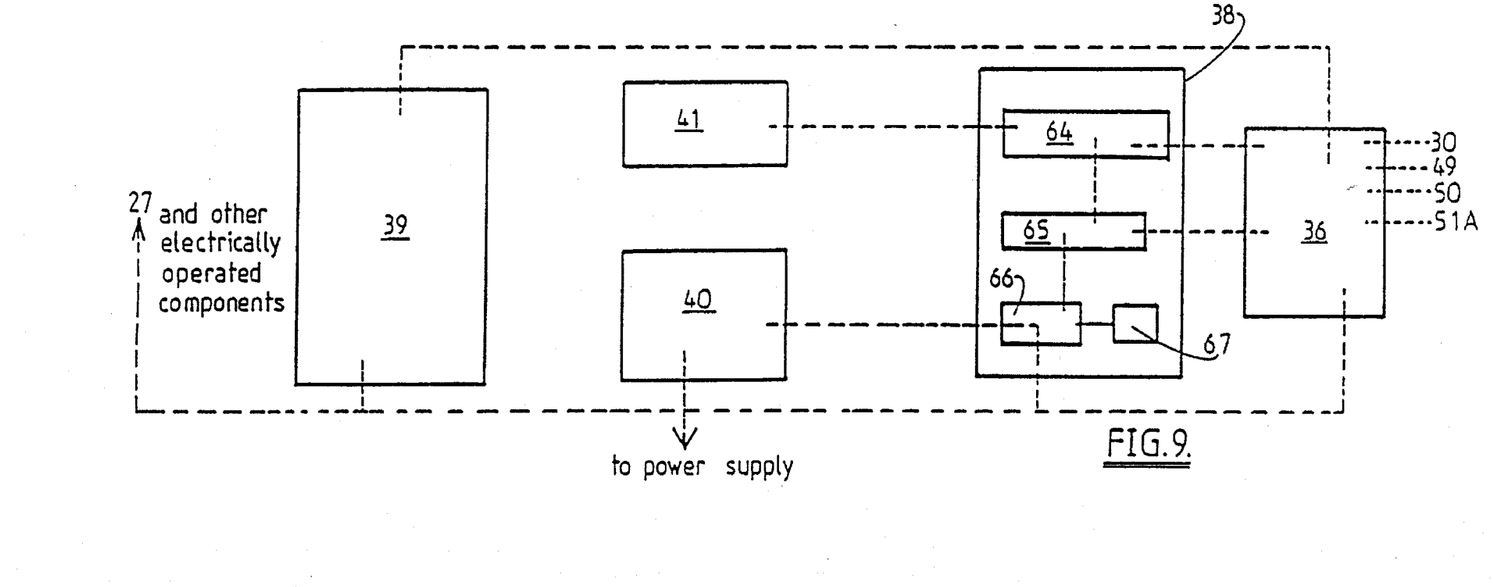
FIG. 9 is a block diagram concerning the electrical circuit used for operation of electrical componentry in the storage chamber.

The switchboard 40 as best shown in FIG. 9 contains a power inlet, power isolation switches and fuses and control cabinet 38 includes a light control module 64 which interprets control signal from the microprocessor(s) in relation to actuation and control of light parameters, contactors 65 which are microprocessor controlled switches actuating and controlling power supply to the strip lighting 27, air conditioner 34 as shown in FIGS. 2–3, humidifier 39 and other electrically operated componentry used in relation to storage chamber 22, transformer(s) 66 for supplying components such as certain parts of the air conditioner 34 with direct current and fuse(s) 67 for the transformer(s) 66. The microprocessor control module 36 contains microprocessor(s) which have a function to calculate, monitor, control and relay all variables or parameters detected by sensors 30, 49, 50 and 51A to maintain predetermined values. Control module 36 also contains relays which relay control signals calculated and interpreted by the microprocessor(s) to relevant electrical componentry. The manual override switches in cabinet 41 provide a manual control of the light parameters if the light control module 64 fails.

The lines in phantom in FIG. 9 illustrate electrical connections which may include a plurality of electrical connections where required.

Figures 10, 11:
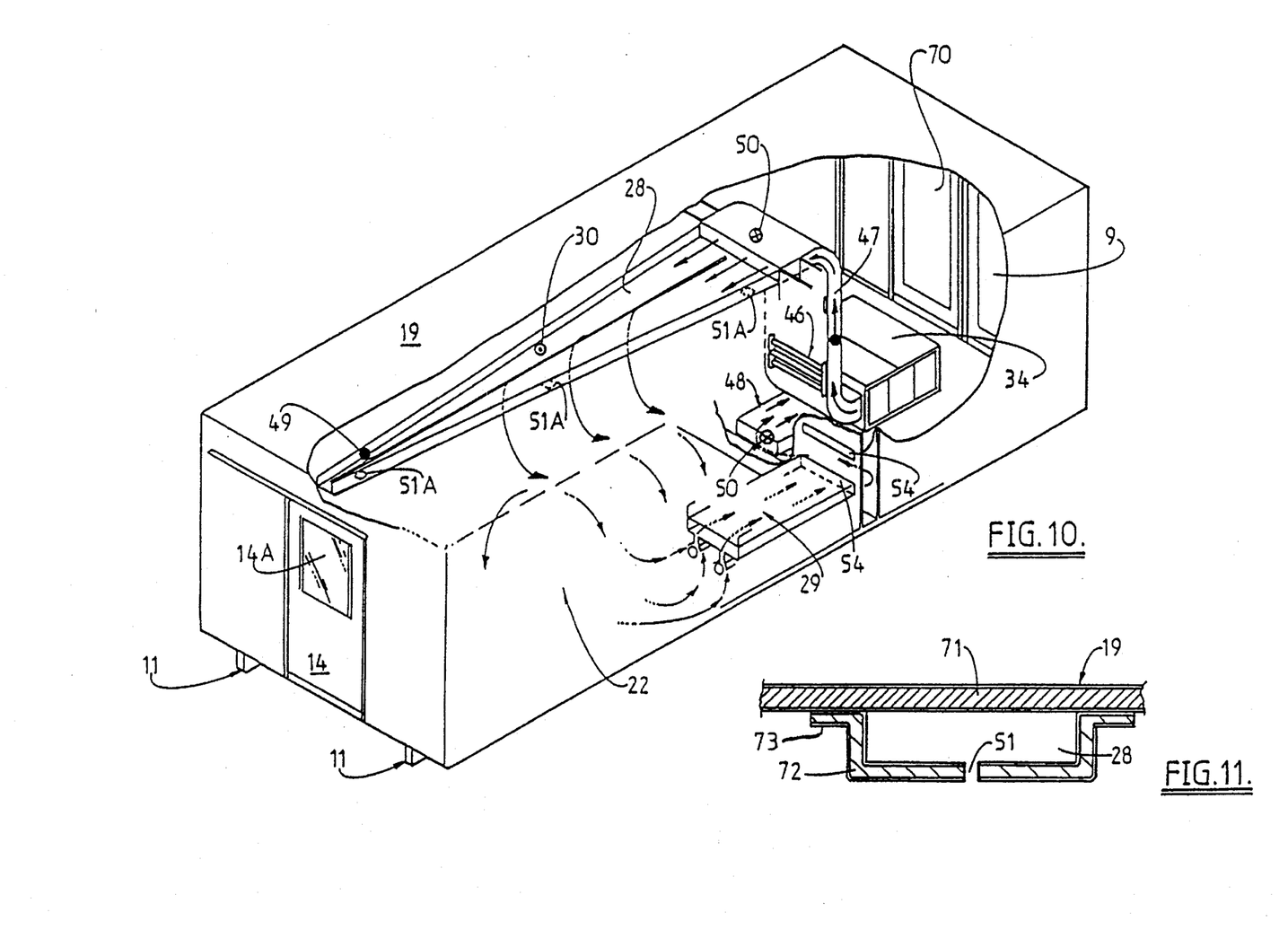
FIG. 10 is a cut away perspective view showing the circulation of air flow throughout the storage chamber of the invention.
FIG. 11 is a transverse section taken through the air supply duct shown in FIG. 4.

The overall circulation of air in storage chamber 22 is shown in FIG. 10 with only a part of return duct(s) 29 being shown for convenience and a transverse section of the supply duct 28 is shown in FIG. 11 wherein supply duct 28 is attached to roof 19 at 73. Insulation layers 71 and 72 are also shown.

In operation of the storage chamber of the invention it will be noted that sensors 30, 49, 50 and 51 in conjunction with appropriate computer software continually adjusts and updates air supply parameters. The air supply duct is suitably configured so that air volume in the supply duct is approximately 10% of the total return air duct volume. The supply volume is based on maximum heat loads per level of storage members 23 and is updated and managed by on line optimal set point control software modifying both air velocity and pressure.

Another improvement over the prior art is the location of all wiring and associated heat producing components other than fluorescent tubes within return ducts 29. In the prior art such wiring and associated heat producing components were located externally of the return ducts and adjacent the strip lighting on the underside of each storage member 23. The addition of sensors 30, 49, 50 and 5]which continually monitor return air parameters from all levels of the storage members 23 has now resulted in virtually all heat produced by the lighting system being removed at source. As a result this has now necessitated only a fraction of the cooling load being required to control the desired environment over the working surface(s) of the interior of the storage chamber.

In addition the in line installation of a series of heating elements 46 facilitate the obtaining of variable settings for minimum temperatures that may be set in the storage chamber such as minimum diurnal temperature. The installation of the heating elements also automatically counteract any heat losses that may be experienced in the storage chamber. Thus, for example, if during a night time cycle the temperature is below a required minimum temperature then the heating elements may be actuated automatically to achieve the desired minimum temperature.

The storage chamber of the invention has also had incorporated in its computer software a series of alarm parameters programmed to update at regular intervals within the system to advise by visual and telephone link of any abnormal activity outside the environmental settings. The alarm system also notifies of sensor malfunction or mechanical breakdown within the storage chamber and automatically manages and shuts down components so as not to cause damage to valuable product.

The storage chamber of the invention may also be programmed to continually and automatically update parameters that cost effectively and efficiently manage the use of all energy requirements. When new climatic settings are requested for example variations from temperature through to tropical environments the relevant computer software shut down sections of the control system to achieve new settings which are calculated to use absolute minimum energy and at the same time avoid trauma damage.

Overall management efficiencies of supply and return air ducts over the entire working system of the control system described above are updated from all sensors within the system by on-line programs which manage all environmental requests to produce and maintain within finite levels the required balanced environment.

All major environmental parameters e.g. light levels, temperature, heat loads, air pressure, air volume, air conditioning and air humidity levels are accurately balanced and maintained utilising on-line computerised systems that optimally manage real time data generated within the control system for recalculating and reprocessing purposes to establish the relevant variable environment.

Therefore the invention is a cost effective method and functionally efficient means of providing a controlled atmosphere storage chamber with a facility of providing optimisation of all relevant parameters in regard to storage of a variety of products that may include:

(i) plant growth at defined temperature, relative humidity light, and gas levels;

(ii) seed germination;

(iii) mushroom growing;

(iv) controlled drying of fruit, flowers, vegetables and nuts etc;

(v) cheese curing and other controlled fermentation environments;

(vi) food processing applications;

(vii) curing of ceramics, pottery and earthenware;

(viii) growth rooms for fish and other aquatic animals;

(ix) sterile rooms for biological control and growth of micro organisms;

(x) quarantine and climate controlled environments for animal experiments;

(xi) specific pathogen free rooms for controlled recombinant DNA technological experiments and genetic engineering; and (xii) operating theatres with defined pathogen free atmospheres.

It also will be appreciated from the foregoing that the term "chamber" includes within its scope a plurality of rooms or a single room in a building interior or one or more compartments in a vehicle interior.

The invention also includes within its scope a method of operation of a controlled atmosphere storage chamber which includes the steps of:

(i) generating cooled and pressurised air;

(ii) causing said cooled and pressurised air to flow throughout the chamber to obtain a balanced distribution within said chamber wherein said cooled and pressurised air adopts an initial supply flow path which path has a transverse dimension or width which tapers progressively inwardly throughout its length towards an end remote from a location where said cooled and pressurised air is generated;

(iii) causing said cooled and pressurised air to flow downwardly from said initial supply flow path towards storage members located in said controlled atmosphere storage chamber having associated therewith one or more heat sources whereby said cooled and pressurised air flows around said one or more heat sources to thereby cause said air to become spent and heat laden; and (iv) effecting said spent and heat laden air to adopt a return flow path towards said location where said cooled and pressurised air is generated which return flow path is of similar taper to said initial supply flow path.

I claim:

1. A controlled atmosphere storage chamber including:

(i) means for generating cooled and pressurised air located within or adjacent the chamber;

(ii) a single air supply duct associated with the generating means for circulating the cooled and pressurised air throughout the chamber wherein the supply duct extends substantially the length of the chamber and has an unrestricted air flow passage which has a transverse dimension that tapers progressively inwardly throughout its length towards an end remote from the generating means;

(iii) air outlet means associated with the supply duct, which air outlet means extends substantially the length of the supply duct;

(iv) at least one elongate hollow storage member having at least one heat source located closely adjacent thereto wherein the interior of the storage member functions as a return duct for return of heat laden air to the generating means, the return duct extending substantially the length of the chamber and having an unrestricted air flow passage which has a transverse dimension that tapers progressively inwardly throughout its length towards an end remote from the generating means; and (v) air inlet means associated with the return duct extending substantially the length of the return duct.

2. A controlled atmosphere storage chamber as claimed in claim 1 wherein the supply duct has a transverse dimension that tapers progressively inwardly throughout its length towards an end of the duct remote from the generating means.

3. A controlled atmosphere storage chamber as claimed in claim 1 wherein the return duct has a transverse dimension that tapers progressively inwardly throughout its length towards an end of the duct remote from the generating means.

4. A controlled atmosphere storage chamber as claimed in claim 1 wherein the air outlet means comprises an elongate slot.

5. A controlled atmosphere storage chamber as claimed in claim 1 wherein the air outlet means comprises a plurality of spaced apertures throughout the length of the supply duct.

6. A controlled atmosphere storage chamber as claimed in claim 1 wherein the air inlet means comprises one or more elongate slots.

7. A controlled atmosphere storage chamber as claimed in claim 1 wherein the air inlet means comprises a plurality of spaced apertures throughout the length of the supply duct, the apertures being arranged in one or more rows.

8. A controlled atmosphere storage chamber as claimed in claim 1 wherein the heat source includes at least one lighting strip.

9. A controlled atmosphere storage chamber as claimed in claim 8 wherein the lighting strip is attached to the underside of the hollow storage member.

10. A controlled atmosphere storage chamber as claimed in claim 1 wherein the hollow storage member has a top support surface comprising a shelf for supporting perishable products.

11. A controlled atmosphere storage chamber as claimed in claim 9 including at least one heat sensor located closely adjacent to the lighting strip.

12. A controlled atmosphere storage chamber as claimed in claim 1 also including at least one air pressure sensor located in the supply duct.

13. A controlled atmosphere storage chamber as claimed in claim 1 also including at least one air pressure sensor located in a return duct.

14. A controlled atmosphere storage chamber as claimed in claim 1 also including at least one air velocity sensor located in the supply duct.

15. A controlled atmosphere storage chamber as claimed in claim 1 also including at least one air velocity sensor located in a return duct.

16. A controlled atmosphere storage chamber as claimed in claim 1 also including humidifying means operatively associated with the chamber.

17. A controlled atmosphere storage chamber as claimed in claim 1 also including at least one humidity sensor located in the return duct.

18. A controlled atmosphere storage chamber as claimed in claim 9 wherein each return duct has located therewithin all heat producing components and wiring associated with each lighting strip which are associated with the return duct.

19. A controlled atmosphere storage chamber as claimed in claim 1 wherein there is provided at least one heating element operatively associated with an inlet end of the supply duct.

20. A controlled atmosphere storage chamber including:
 (i) means for generating cooled and pressurised air located within or adjacent the chamber;
 (ii) at least one air supply duct associated with the generating means for circulating the cooled and pressurised air throughout the chamber wherein the supply duct extends substantially the length of the chamber and has an unrestricted air flow passage which has a transverse dimension that tapers progressively inwardly throughout its length towards an end remote from the generating means, the supply duct having a plurality of baffles on opposite inner sides of progressively increasing dimensions transverse to the length of the supply duct from an end adjacent the generation means to an end remote from the generation means to provide a tapered unrestricted air flow passage which has a transverse dimension that tapers progressively inwardly throughout its length towards the remote end;
 (iii) air outlet means associated with the supply duct, which air outlet means extends substantially the length of the supply duct;
 (iv) at least one elongate hollow storage member having at least one heat source located closely adjacent thereto wherein the interior of the storage member functions as a return duct for return of heat laden air to the generating means, the return duct extending substantially the length of the chamber and having an unrestricted air flow passage which has a transverse dimension that tapers progressively inwardly throughout its length towards an end remote from the generation means; and
 (v) air inlet means associated with the return duct extending substantially the length of the return duct.

21. A controlled atmosphere storage chamber including:
 (i) means for generating cooled and pressurised air located within or adjacent the chamber;
 (ii) at least one air supply duct associated with the generating means for circulating the cooled and pressurised air throughout the chamber wherein the supply duct extends substantially the length of the chamber and has an unrestricted air flow passage which has a transverse dimension that tapers progressively inwardly throughout its length towards an end remote from the generating means;
 (iii) air outlet means associated with the supply duct, which air outlet means extends substantially the length of the supply duct;
 (iv) at least one elongate hollow storage member having at least one heat source located closely adjacent thereto wherein the interior of the storage member functions as a return duct for return of heat laden air to the generating means, the return duct extending substantially the length of the chamber and having an unrestricted air flow passage which has a transverse dimension that tapers progressively inwardly throughout its length towards an end remote from the generation means, the return duct having a plurality of baffles on opposite inner sides of progressively decreasing dimensions transverse to the length of the supply duct from an end adjacent the generation means to an end remote from the generation means to provide a tapered unrestricted air flow passage which has a transverse dimension that tapers progressively inwardly throughout its length towards the remote end; and
 (v) air inlet means associated with the return duct extending substantially the length of the return duct.

* * * * *